E. FULDA.
WIRE REEL.
APPLICATION FILED JULY 12, 1920.

1,424,651. Patented Aug. 1, 1922.

Inventor
Edward Fulda
By his Attorneys
Townsend & Decker

UNITED STATES PATENT OFFICE.

EDWARD FULDA, OF NEW YORK, N. Y.

WIRE REEL.

1,424,651.  Specification of Letters Patent.  Patented Aug. 1, 1922.

Application filed July 12, 1920. Serial No. 395,615.

*To all whom it may concern:*

Be it known that I, EDWARD FULDA, a citizen of the United States, and a resident of New York, in the county of New York and State of New York, have invented certain new and useful Improvements in Wire Reels, of which the following is a specification.

This invention relates to metal reels particularly adapted for moving picture films.

The object of the invention is to provide a simple form of reel constructed mainly of wire whereby the reel will be light, strong and capable of withstanding much abuse.

Reels for moving picture films have been commonly made with sheet metal plates for the side members, which plates have had to be of fairly heavy metal to stand the abuse of throwing the reel around. The operators usually discard the reels by throwing them on the floor which results in the edges of the plates becoming dented or bent and when the reel is again used the dent or bent part catches the film and tears or breaks it. Also the edges of the plates are comparatively sharp and as the operators, when it is necessary to stop the rotation of the reel quickly, usually stop the rotation by pressing their hand on the periphery of the reel, they cut themselves and inflict more or less serious injuries.

By this invention all sharp edges around the periphery of the reel are obviated and throwing the reel around does not result in any sharp dents which are liable to injure or break the film. Also the reel is more easily straightened if it becomes bent out of shape than reels having sheet metal plates for the side members.

To these ends the invention consists in the reel for moving picture films constructed and arranged as hereinafter more particularly described and then specified in the claims.

In the accompanying drawings, Fig. 1 is a side elevation of a reel constructed in accordance with this invention.

Figure 1:
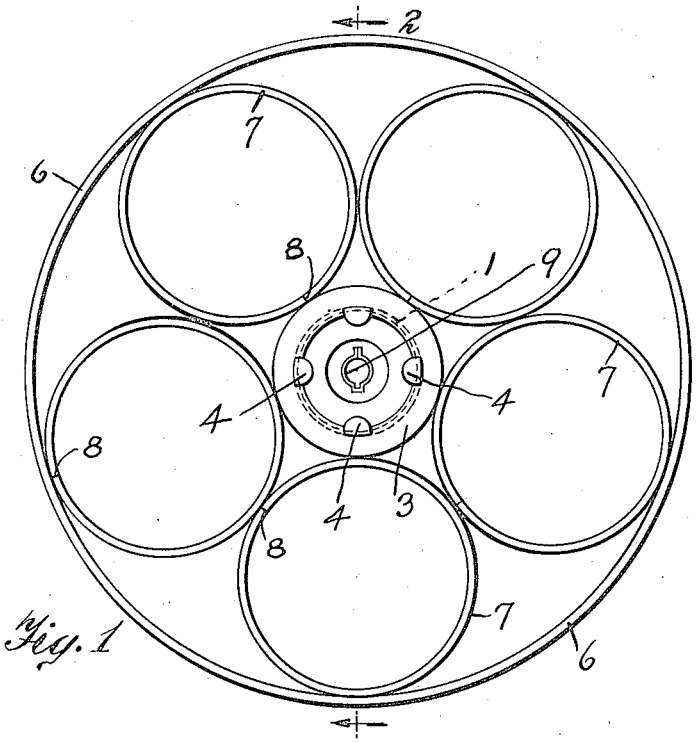
Figure 2:
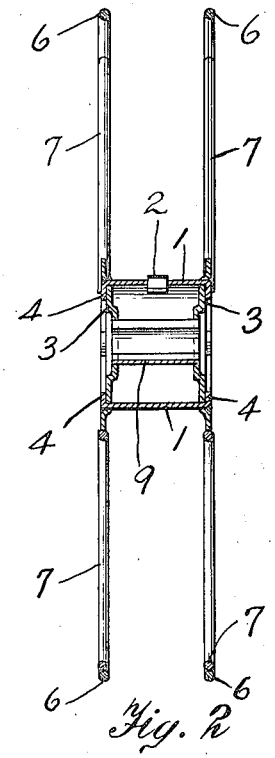
Fig. 2 is a transverse cross-section of the same taken on the line 2—2 Fig. 1.
Figure 3:
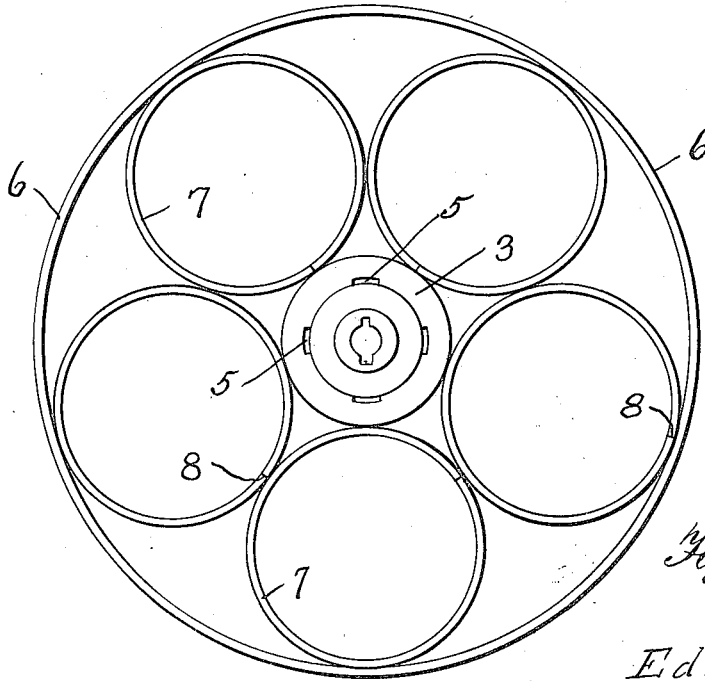
Fig. 3 is a side elevation of one of the side members previous to securing it to the hub.
Figure 4:
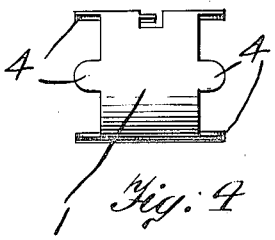
Fig. 4 is a side elevation of the hub sleeve.

1 indicates a metal hub sleeve upon which the film is wound and to which it is secured by a clip 2 in any of the usual ways.

3 indicates hub plates, one being secured at each end of the sleeve 1 preferably by ears 4, integral with the sleeve, passing through slots 5 in the plates and bent over against the outer surface of the plates.

6 indicates an endless ring, preferably of round wire, which constitutes the periphery of the reel. The space between the ring 6 and the hub is filled out by a plurality of wire members which also secure the ring and hub together. As will be seen, these wire members are made of curved wire curved in the plane of the ring. Preferably such filler members are in the form of wire rings 7, each ring being of a size to connect the ring 6 and the hub plate 3 as well as to connect with its neighboring rings. Each ring makes contact by its outer edge with the inside ring 6 and also said neighboring rings contact with each other at their outside edges.

The rings 7 are disposed in the plane of the peripheral ring 6 and the plate 3 and at the points of contact between the rings 7 and hub plates 3, as well as at the points of contact with the ring 6 and with each other, they are electrically welded together. Preferably the ends 8 of the rings are brought together at a point of weld so that they are firmly held by the welding operation.

The rings 6 and 7 constitute the side members of the reel, it being understood that one of these members is provided at each end of the hub sleeve 1. 9 indicates the key-slotted spindle sleeve usually employed in reels of this character.

By having the rings 6 and 7 contact with each other along curved surfaces and by having the rings 7 contact with the curved periphery of the hub plates 3 a restricted contact is provided to facilitate the welding operation when the electric resistance welding process is employed to secure the parts together.

What I claim as my invention is:—

1. In a moving picture film reel, a hub upon which the film is wound, side members comprising a continuous wire ring forming the periphery of the reel and curved wire elements curved in the plane of the ring and securing said peripheral ring to said hub.

2. In a moving picture film reel, a hub upon which the film is wound, side members comprising a continuous wire ring forming the periphery of the reel and curved wire elements curved in the plane of the ring and welded to the inside of said peripheral ring, said wire elements filling in the space between said ring and said hub.

3. In a moving picture film reel, a metal hub sleeve upon which the film is wound, a wire ring forming the periphery of the reel and curved wire filler members curved in the plane of the ring and welded by their outer edges to the ring and the hub.

4. In a film reel, a hub sleeve upon which the film is wound, a hub plate secured to each end of said sleeve, a wire ring forming the periphery of the reel and curved wire filler members bent in the plane of the ring and welded to the ring and the hub, said ring, wire members and hub plate all being located in the same plane.

5. In a film reel, a hub sleeve upon which the film is wound, a hub plate secured to each end of the sleeve, a wire ring disposed at each end of the hub sleeve and forming the periphery of the reel and wire rings welded to the peripheral ring and the hub plates.

6. In a film reel, a hub sleeve upon which the film is wound, a hub plate at each end of said sleeve, turned-over ears securing the sleeve and plates, wire rings in line with the hub plates and forming the periphery of the reel and curbed wire elements welded to each other at their outer edges and to the inside edges of the peripheral rings and to the hub plates.

7. In a film reel, a hub sleeve upon which the film is wound, a hub plate at each end of the sleeve, a wire ring at each end of the sleeve in the general plane of the hub plate and forming the periphery of the reel and wire rings welded to each other and to the peripheral ring and the hub.

8. A reel comprising a metal hub and hub plates, wire rings curved to the periphery of the reel and filler members consisting of wire rings disposed in the same plane and within the first-named rings and engaging along their curved surfaces with the insides of said first-named rings and with one another and with the curved periphery of the hub plates.

9. A reel comprising a hub sleeve and hub plates, wire rings forming the periphery of the reel and filler members consisting of wire rings disposed in the same plane as the first-named rings and welded to one another and to the inside of said first-named ring, said filler members filling the spaces between the outer ring and the hub plates.

10. In a reel, the combination of hub and side members comprising outer continuous wire rings and filler rings disposed within the latter and in the same plane therewith to fill the space between the same and the hub, said filler members being welded at their peripheries to one another and to the inside of the outer ring.

11. In a reel, the combination of hub and side members comprising outer continuous wire rings and filler rings disposed within the latter and in the same plane therewith to fill the space between the same and the hub, said filler members being welded at their peripheries to one another and to the inside of the outer ring and to the hub.

Signed at New York in the county of New York and State of New York this 9th day of July A. D. 1920.

EDWARD FULDA.

Witness:
IRENE LEFOWITZ.